United States Patent
Ishimaru et al.

(10) Patent No.: US 12,540,303 B2
(45) Date of Patent: Feb. 3, 2026

(54) CELL DETECTION DEVICE AND CELL DETECTION METHOD

(71) Applicant: HITACHI HIGH-TECH CORPORATION, Tokyo (JP)

(72) Inventors: Masako Ishimaru, Tokyo (JP); Hideyuki Noda, Tokyo (JP)

(73) Assignee: HITACHI HIGH-TECH CORPORATION, Tokyo (JP)

(*) Notice: Subject to any disclaimer, the term of this patent is extended or adjusted under 35 U.S.C. 154(b) by 811 days.

(21) Appl. No.: 17/056,454

(22) PCT Filed: May 23, 2019

(86) PCT No.: PCT/JP2019/020429
§ 371 (c)(1),
(2) Date: Nov. 18, 2020

(87) PCT Pub. No.: WO2019/230548
PCT Pub. Date: Dec. 5, 2019

(65) Prior Publication Data
US 2021/0207072 A1    Jul. 8, 2021

(30) Foreign Application Priority Data

May 29, 2018  (JP) .................................. 2018-102145

(51) Int. Cl.
*C12M 1/34* (2006.01)
*G01N 21/76* (2006.01)

(52) U.S. Cl.
CPC ............ *C12M 41/32* (2013.01); *C12M 41/46* (2013.01); *G01N 21/763* (2013.01); *G01N 2201/0231* (2013.01); *G01N 2201/064* (2013.01)

(58) Field of Classification Search
None
See application file for complete search history.

(56) References Cited

U.S. PATENT DOCUMENTS

| 5,217,875 A | 6/1993 | Karpf et al. |
| 6,074,870 A | 6/2000 | Berndt |

(Continued)

FOREIGN PATENT DOCUMENTS

| CN | 101039256 A | 9/2007 |
| EP | 0333253 A2 | 9/1989 |

(Continued)

OTHER PUBLICATIONS

Wang, M. et al., "Early identification of microorganisms in blood culture prior to the detection of a positive signal in the BACTEC FX system using matrix-assisted laser desorption/ionization-time of flight mass spectrometry," Journal of Microbiology, Immunology and Infection (2015) 48, 419-424.

(Continued)

*Primary Examiner* — Neil N Turk
(74) *Attorney, Agent, or Firm* — Volpe Koenig

(57) ABSTRACT

A cell detector and detecting method enhance detection sensitivity for microbes according to the ATP method and reduce the detection period. The cell detector includes a sealing container having a culture portion for containing a culture medium containing the specimen, a sealable specimen introducing portion, and a luminescent reagent portion that emits light upon contact with the culture medium, a contact mechanism for controlling the contact between the culture medium and the luminescent reagent portion, a photodetector for detecting a luminescence resulting from the contact between the culture medium and the luminescent reagent portion, and a calculation unit for calculating a luminescent quantity from detection signals of the photodetector to determine cell proliferation on the basis of change in the luminescent quantity over time. The culture portion and the luminescent reagent portion are separately posi- (Continued)

tioned, and the contact mechanism intermittently brings the culture medium and the luminescent reagent into contact.

15 Claims, 7 Drawing Sheets

(56) References Cited

U.S. PATENT DOCUMENTS

| | | |
|---|---|---|
| 2004/0058408 A1 | 3/2004 | Thomas et al. |
| 2010/0233751 A1* | 9/2010 | Kunji ................ G01N 21/8507 435/287.1 |
| 2013/0164848 A1 | 6/2013 | Munaka et al. |
| 2013/0295554 A1 | 11/2013 | Zdanovsky |
| 2015/0072401 A1* | 3/2015 | Nozaki ................ C12M 37/00 435/303.1 |
| 2016/0348146 A1 | 12/2016 | Miyashita et al. |
| 2017/0314057 A1 | 11/2017 | Tada et al. |
| 2018/0057853 A1 | 3/2018 | Noda et al. |

FOREIGN PATENT DOCUMENTS

| | | |
|---|---|---|
| EP | 1347301 A1 | 9/2003 |
| JP | 06-153994 A | 6/1994 |
| JP | 08-205851 A | 8/1996 |
| JP | 2696081 B2 | 1/1998 |
| JP | 2002-238544 A | 8/2002 |
| JP | 2007/228863 A | 9/2007 |
| WO | 82/04264 A1 | 12/1982 |
| WO | 90/13663 A1 | 11/1990 |
| WO | 2010/078482 A1 | 7/2010 |
| WO | 2012/032844 A1 | 3/2012 |
| WO | 2015/141594 A1 | 9/2015 |
| WO | 2016/103433 A1 | 6/2016 |
| WO | 2016/147313 A1 | 9/2016 |

OTHER PUBLICATIONS

Okanojo, M., et al., "Attomol-level ATP bioluminometer for detecting single bacterium," Luminescence, Aug. 2017 (Epub Dec. 1, 20163), vol. 32, No. 5, pp. 751-756, abstract, fig. 1, 2.

International Search Report, PCT/JP2019/020429, Jul. 30, 2019, 2 pgs.

Extended European Search Report dated Jan. 12, 2022 for European Patent Application No. 19810563.7.

Walenta et al. "Metabolic mapping with bioluminescence: basic and clinical relevance." Biomolecular engineering vol. 18,6: 249-62 (2002).

* cited by examiner

CELL DETECTION DEVICE AND CELL DETECTION METHOD

TECHNICAL FIELD

The present invention relates to a cell detector and a cell detecting method, for detecting cells in a specimen.

BACKGROUND ART

For the purpose of confirming presence or absence of microbes in a normally aseptic specimen e.g. a clinical specimen such as blood, a cell preparation, or the like, a conventional method has been used, in which a specimen is added to a liquid medium and cultured to proliferate bacteria or fungi (microbes), and presence or absence of microbes is detected.

Turbidimetry is a simple and common method for detecting microbial proliferation, but it is difficult to detect microbial proliferation in a specimen that is originally cloudy like blood. As a method for detecting microbial proliferation other than the turbidimetry, PTL 1 discloses a method using an automatic meter that simultaneously detects production and consumption associated with microbial proliferation in multiple specimens. This automatic meter adopts fluorimetry in which a fluorescent dye having a fluorescence that changes in association with change in a concentration of a gas such as carbon dioxide and oxygen is fixed to a bottom of a culture bottle, and change in the gas concentration due to microbial proliferation is fluorescently detected. It is known that, in the fluorimetry, a specimen is judged as positive when viable microbes proliferate up to about $10^7$ CFU/mL (CFU: colony forming unit) or more (NPL 1).

In addition, a detection method using adenosine triphosphate (ATP) method is known as a method of detecting microbes with high sensitivity. The ATP method is a method of detecting cellular ATP by bioluminescence through a luciferin-luciferase reaction, and generally the method is highly sensitive because about 100 CFU of microbes can be detected. For example, PTL 2 discloses that bacterial proliferation and death can be detected with high sensitivity by dispensing a culture medium of bacteria and a luminescent reagent into a plate and measuring luminescence according to the ATP method. PTL 2 also discloses that a container is sealed and a gas feeding mechanism is placed so that anaerobic microbes can be detected.

CITATION LIST

Patent Literatures

PTL 1: JP Patent No. 2696081
PTL 2: WO 2016/147313

Non-Patent Literature

NPL 1: Journal of Microbiology, Immunology and Infection (2015) 48, 419-424

SUMMARY OF INVENTION

Technical Problem

However, the fluorimetry disclosed in PTL 1 has a low sensitivity and cannot detect microbes unless viable microbes proliferate up to $10^7$ CFU/mL or more. Thus, in a case of a specimen having a small number of initial microbes or slow proliferating microbes, there is a problem that it takes a long time to detect the microbes.

In addition, as described in PTL 2, the conventional ATP method requires an operation in which a culture medium is fractionated every hour and mixed with a luminescent reagent. The operation of fractionating the culture medium increases a possibility of contaminating the culture medium by contamination with microbes from the outside, leading to false positive of a test. When a luminescent reagent is previously mixed with the culture medium and sealed, luminescence can be continuously measured without fractionation. However, since ATP and a luciferin react irreversibly and are removed from a reaction system in a luciferin-luciferase reaction, there are problems that ATP generated by microbes are always consumed in a luminous reaction, and luminescence intensity and sensitivity decrease.

Thus, the present invention provides a cell detector and a cell detecting method in which detection sensitivity for microbes in a specimen according to the ATP method is enhanced and a detection period is reduced.

Solution to Problem

In order to solve the above problems, the representative cell detector according to the present invention is a cell detector for detecting cells in a specimen, the cell detector including a sealing container having a culture portion for containing a culture medium containing the specimen, a sealable specimen introducing portion, and a luminescent reagent portion containing a luminescent reagent that emits light upon contact with the culture medium, a contact mechanism for controlling the contact between the culture medium and the luminescent reagent, a photodetector for detecting luminescence resulting from the contact between the culture medium and the luminescent reagent, and a calculation unit for calculating a luminescent quantity from detection signals of the photodetector to determine cell proliferation on the basis of change in the luminescent quantity over time, in which the culture portion and the luminescent reagent portion are separately positioned, and the contact mechanism intermittently brings the culture medium and the luminescent reagent into contact with each other.

In addition, the representative cell detecting method according to the present invention is a cell detecting method for detecting cells in a specimen, the method including a step of introducing a luminescent reagent into a sealing container, a step of introducing a culture medium containing the specimen into a position away from the luminescent reagent in the sealing container, a step of sealing the sealing container, a step of intermittently bringing the culture medium and the luminescent reagent into contact with each other, a step of measuring a luminescent quantity resulting from the contact between the culture medium and the luminescent reagent, and a step of determining cell proliferation on the basis of change in the luminescent quantity over time.

Advantageous Effects of Invention

According to the present invention, detection sensitivity for microbes in a specimen according to the ATP method can be enhanced and a detection period can be reduced.

Problems, configurations, and effects other than those described above will be clarified by the following description of embodiments.

DESCRIPTION OF EMBODIMENTS

Hereinafter, Examples will be explained with reference to the figures.

Example 1

Configuration Example of Cell Detector

Figure 1:
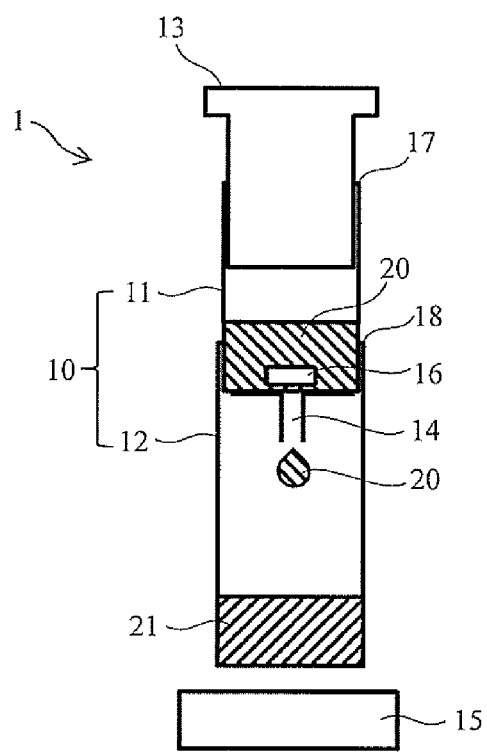
FIG. 1 is a configuration diagram illustrating a cell detector 1 according to Example 1.

A cell detector according to an embodiment of the present invention will be explained with reference to FIG. 1. FIG. 1 is a configuration diagram illustrating a cell detector 1 according to Example 1.

As illustrated in FIG. 1, the cell detector 1 includes a sealing container 10 having an upper container 11 (culture portion) and a lower container 12 (luminescent reagent portion), a plunger 13 (contact mechanism), and a photodetector 15. The upper container 11 and the lower container 12 are fitted into and in close contact with each other on an opening 18 of the lower container 12. The plunger 13 is fitted into the upper container 11 on an opening 17 (specimen introducing portion) of the upper container 11 and configured to be able to seal the sealing container 10. Microbial invasion (contamination) from the outside can be prevented by sealing the sealing container 10.

The upper container 11 is a container for containing a culture medium 20 including a specimen that may contain microbes (cells), and a liquid medium. The upper container 11 includes a flow passage 14 for dripping the culture medium 20 into the lower container 12. A septum may be fitted into the opening 17 of the upper container 11. In this case, the specimen is sampled with a syringe and a needle of the syringe is penetrated through the septum, so that the specimen can be aseptically introduced into the upper container 11. In this case, the plunger 13 can be fitted into the container from an upper part of the septum.

Instead of disposing the septum on the opening 17, it is possible to take a configuration that a hole vertically penetrating the plunger 13 is formed on the plunger 13, and the specimen is introduced into the upper container 11 from this hole. In this case, it is preferable to dispose the septum on the hole of the plunger 13 and then introduce the specimen using the syringe.

The lower container 12 is a container for containing a luminescent reagent 21. The luminescent reagent 21 can be e.g. a reagent containing a luciferase and a luciferin, which emits light by a luciferin-luciferase reaction in the presence of ATP. The luciferin-luciferase reaction is enhanced in the presence of oxygen. The luciferase may be introduced into the lower container 12 and the luciferin may be mixed with the culture medium 20. In addition, the luciferin and luciferase may be introduced into the lower container 12, and the luciferin may be mixed with the culture medium 20.

The luminescent reagent 21 can also be e.g. a chemiluminescent reagent for quantifying active oxygen produced by a quinone oxidoreductase (NADPH or NADH) derived from viable microbes in the presence of a quinone. In this case, the chemiluminescent reagent is introduced into the lower container 12 and the quinone is added to the culture medium 20, so that active oxygen is produced in the culture medium 20 by the reaction of the quinone and the quinone oxidoreductase. This culture medium 20 is dripped into the chemiluminescent reagent, so that the chemiluminescent reagent reacts with active oxygen to emit light. Since active oxygen increases depending on microbial proliferation, a luminescent quantity in proportion to microbial proliferation can be measured.

Examples of the chemiluminescent reagent include 2-methyl-6-phenyl-3,7-dihydroimidazo[1,2-a]pyrazine-3-one (CLA), 2-methyl-6-(4-methoxyphenyl)-3,7-dihydroimidazo[1,2-a]pyrazine-3-one (MCLA), 2-methyl-6-p-methoxyphenyl ethynyl imidazopyrazinone (MPEC), indocyanine-type imidazopyrazinone compound (NIR-CLA), and the like.

The luminescent reagent 21 is introduced into the lower container 12, the upper container 11 is fitted into the lower container 12, the culture medium 20 is introduced into the upper container 11, then the plunger 13 is fitted into the opening 17 of the upper container 11, so that the luminescent reagent 21 and the culture medium 20 are sealed in the sealing container 10. At this time, the culture medium 20 and the luminescent reagent 21 are located away from each other in the container. Note that, in this specification, the sealing means that the microbes cannot pass through the container, and pores and gaps having a size that prevents microbes from passing through the container, such as pores and gaps of 0.1 μm or less, are acceptable.

In the sealing container 10, at least the lower container 12 is made of a material through which a wavelength of light emitted by luminous reaction can transmit. For example, when the luminescent reagent is a substance that causes a reaction capable of emitting a visible light, the sealing container 10 can be made of a colorless and transparent plastic, glass, or the like.

A part of a wall of the sealing container 10 may be made of a material through which cells do not pass and a gas can pass. Examples of the material through which a gas can pass include a membrane filter having a pore diameter of about 0.1 μm. In this way, when the gas inside and outside of the sealing container 10 can passthrough the wall, a gas composition in the sealing container 10 can be controlled from the outside of the sealing container 10, and the gas composition can be adapted to the microbial proliferation. For example, when luminescence measurement for anaerobic microbes is conducted, an oxygen-free gas can be fed to the inside of the upper container 11 to establish an anaerobic condition, and an oxygen-containing gas can be fed to the inside the lower container 12 to establish an aerobic condition.

The photodetector 15 is disposed at a position where light emitted by the luminescent reagent 21 in the lower container 12 can be detected outside the sealing container 10. The photodetector 15 detects light emitted by the luminescent reagent 21 at a certain time interval or at all times during culture. The photodetector 15 includes a calculation unit (not shown) for calculating a luminescent quantity from detection signals and judging the specimen as positive or negative, and the like. The photodetector 15 also includes a storage unit (not shown) for storing data of a certain threshold value and the like for judging the specimen as positive or negative from the luminescent quantity derived from the microbes.

The calculation unit can also calculate a value obtained by subtracting a luminescent quantity immediately before dripping of the culture medium 20 from a maximum value of a luminescent quantity after dripping of the culture medium 20 (increment in the luminescent quantity) as the luminescent quantity derived from the microbes. In addition, the calculation unit judges the specimen as positive (the microbes are present in the specimen) or negative (the microbes are absent in the specimen) by comparing the threshold value with the luminescent predetermined certain quantity derived from the microbes.

The photodetector 15 may include a display unit for displaying the calculated luminescent quantity and the result of the positive or negative judgement. The photodetector 15 may also include a speaker that emits an alarm sound indicating the judgement result from the calculation unit.

The lower container 12 at least around the luminescent reagent 21 is made of a material through which a wavelength of light emitted by luminous reaction transmits. For example, when the luminescent reagent 21 is a substance that causes a reaction capable of allowing the luminescent reagent 21 to emit visible light, the lower container 12 can be made of a colorless and transparent plastic, glass, or the like.

The culture medium 20 may be stirred by introducing an stirring bar 16 (stirring means) into the culture medium 20 in the upper container 11 or by vibrating or rotating the sealing container 10 from the outside of the sealing container 10. The microbes are uniformly dispersed by stirring the culture medium 20, and a luminescent quantity in proportion to the microbes concentration can be obtained when dripping the culture medium 20 into the luminescent reagent 21. In addition, preferably, culture is conducted such that the sealing container 10 is placed in an incubator that regulates a temperature (temperature regulating means).

<Measurement Method>

Next, an example of a measurement method using the cell detector 1 according to Example 1 will be explained. First, a user introduces the luminescent reagent 21 into the lower container 12 and fits the upper container 11 into the opening 18. Subsequently, the user introduces the previously prepared culture medium 20 into the upper container 11 and fits the plunger 13 into the opening 17.

Subsequently, for the purpose of measuring a luminescent quantity at hour 0 (initial concentration of the microbes), the user drips the culture medium 20 through the flow passage 14 to mix the culture medium 20 with the luminescent reagent 21 by pushing the plunger 13 from the outside to a certain extent. At this time, the photodetector 15 begins to measure the luminescent quantity at hour 0. The calculation unit of the photodetector 15 calculates a value obtained by subtracting a luminescent quantity immediately before dripping of the culture medium 20 from a maximum value of a luminescent quantity after dripping of the culture medium 20 (increment in the luminescent quantity) as the luminescent quantity derived from the microbes.

After culture for a certain period, e.g. after one hour, the user pushes the plunger 13 again from the outside to a certain extent and drips the culture medium 20 in the same amount as at hour 0 into the luminescent reagent 21. The photodetector 15 measures the luminescent quantity at hour 1. Then the culture is conducted again for a certain period.

As described above, dripping of the culture medium 20 and measurement of the luminescent quantity are repeated at a certain time interval to determine e the microbial proliferation from changes in the luminescent quantity over time. This time interval (culture period) may be constant or may be changed at an appropriate timing.

When the luminescent quantity of the entire culture medium or the luminescent quantity derived from the microbes reaches a predetermined certain threshold value or higher, the photodetector 15 deems the microbes to have proliferated and judges the specimen as positive.

The threshold value of the luminescent quantity for judging the specimen as positive can be set to e.g. a value obtained by multiplying the luminescent quantity at hour 0 by three times, or the like. Alternatively, the threshold value can be set to a value obtained by calculating a standard deviation of the luminescent quantity at hour 0 in multiple measurements and adding three times the standard deviation to the luminescent quantity at hour 0, or the like. To improve certainty of the positive judgement, it is preferable to set the threshold value to e.g. a value obtained by multiplying the luminescent quantity at hour 0 by 10 times, a value obtained by multiplying a sum of the luminescent quantity at hour 0 and the standard deviation by 10 times, or the like. For example, the luminescence measurement is conducted multiple times under the same conditions (same initial concentration, same temperature, and the like), an average value of the luminescent quantity over the culture period that allows the calculation unit to judge the specimen as positive is calculated, and the average value may be defined as the threshold value. Alternatively, each threshold value recommended for each microbial species to be measured may be set.

Herein, when the maximum number of measurements of change in the luminescent quantity over time is defined as S and an amount of the culture medium 20 to be dripped per one measurement is defined as L (mL), the amount of the culture medium 20 needs to be at least S×L (mL). When the culture medium 20 is required for microbial species identification and drug susceptibility test after the specimen is judged as positive, the amount of the culture medium 20 is preferably 2×S×L (mL) or more. In addition, the amount of the luminescent reagent 21 is preferably 5×S×L (mL) or more. This is because it is possible to prevent a luminous efficiency from changing due to gradual dilution of the luminescent reagent 21 by dripping of the culture medium 20, by using the luminescent reagent 21 in an excess amount compared to the amount of the culture medium 20 to be dripped. For example, when the amount of the culture medium 20 dripped at one time is 10 μL and measurement is conducted up to 10 times, the microbes can be detected with high sensitivity in the cell detector 1 by setting the amount of the culture medium 20 to 0.2 mL or more and setting the amount of the luminescent reagent 21 to 0.5 mL or more. Further, after the detection, the microbial species can be identified and the drug susceptibility test can be conducted.

Note that, in Example 1, it is also possible to take a configuration that the luminescent reagent 21 is introduced into the upper container 11 and the culture medium 20 is introduced into the lower container 12 to drip the luminescent reagent 21 into the culture medium 20. From the viewpoint of improving the sensitivity of the luminescence measurement, the configuration of dripping the culture medium 20 as illustrated in FIG. 1 is preferable.

Measurement Example 1

Figure 2:
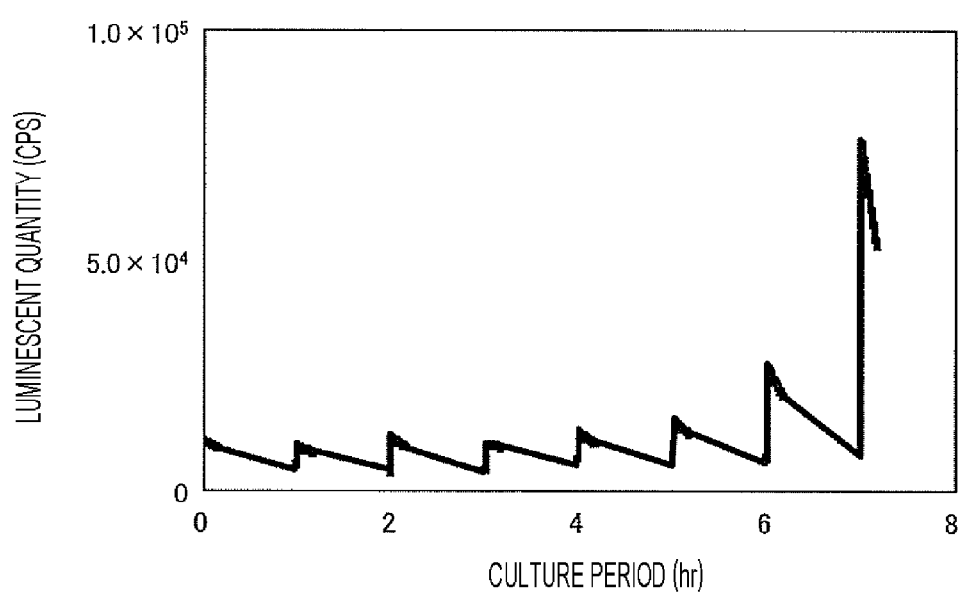
FIG. 2 graph presenting results of measuring proliferation of *E. coli* by luminescence measurement using a luciferin-luciferase reaction.
Figure 3:
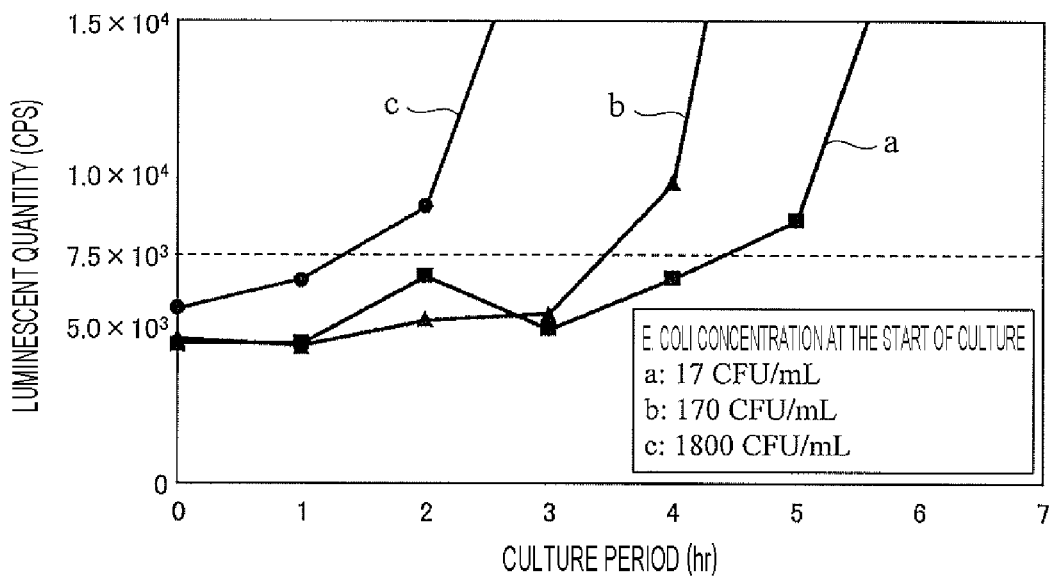
FIG. 3 is a graph presenting a luminescent quantities derived from *E. coli* calculated from the results of the luminescence measurement.

A measurement example of the luminescence measurement using the cell detector 1 according to Example 1 will be explained with reference to FIG. 2 and FIG. 3. FIG. 2 is a graph presenting results of measuring proliferation of E. coli by luminescence measurement using the luciferin-luciferase reaction. FIG. 3 is a graph presenting luminescent quantities derived from E. coli calculated from the results of the luminescence measurement.

First, 0.5 mL of ATP luminescent reagent (BacTiterGLo, manufactured by Promega Corporation) was introduced into the lower container 12. This ATP luminescent reagent contained the luciferin and the luciferase as well as a surfactant for destroying the microbes to extract ATP in the microbes. When the culture medium was mixed with the ATP luminescent reagent, ATP was immediately extracted from the microbes, and both the free ATP and the microbe-derived ATP in the solution caused the luciferin-luciferase reaction to emit light.

Next, the upper container 11 was fitted into the lower container 12 containing the ATP luminescent reagent, and a previously-prepared E. coli culture medium (E. coli concentration was 17 CFU/mL at hour 0) was introduced into the upper container 11. The plunger 13 was fitted into the upper container 11 containing the E. coli culture medium, and the sealing container 10 was sealed.

The plunger 13 was pushed to drip 10 µL of E. coli culture medium into the ATP luminescent reagent every hour, and the luminescent quantity was measured by the photodetector 15 disposed under the lower container 12. The luminescent quantity was measured for approximately one minute before and after the dripping of the E. coli culture medium. The results are presented in FIG. 2.

In addition, a value obtained by subtracting the luminescent quantity immediately before the dripping from the maximum value of the luminescent quantity after the dripping was calculated as the luminescent quantity derived from E. coli. The results are presented in the line graph a in FIG. 3.

Measurement Example 2

The luminescent quantity was measured in the same way as in Measurement Example 1 except that the E. coli concentration in the E. coli culture medium at hour 0 was 170 CFU/mL. The results are presented in the line graph b in FIG. 3.

Measurement Example 3

The luminescent quantity was measured in the same way as in Measurement Example 1 except that the E. coli concentration in the E. coli culture medium at hour 0 was 1800 CFU/mL. The results are presented in the line graph c in FIG. 3.
(Measurement Results)

When a threshold value of the luminescent quantity derived from E. coli for judging the specimen as positive was set to $7.5 \times 10^3$ CPS (CPS: Count Per Second) as presented by the dashed line in FIG. 3, the specimen became positive in 5 hours in Measurement Example 1. As presented in FIG. 3, the specimen became positive in 4 hours and 2 hours in measurement Example 2 and Measurement Example 3, respectively. The microbe detecting sensitivity in Example 1 was $3 \times 10^5$ CFU/mL, which was two orders of magnitude higher than the $10^7$ CFU/mL in fluorimetry, and allowed detection of microbial proliferation in a shorter period than in fluorimetry.
<Technical Effect>

As described above, Example 1 adopts a configuration that the culture medium and the luminescent reagent are housed in the sealing container such that the culture medium and the luminescent reagent are positioned away from each other, and the culture medium is dripped into the luminescent reagent. Thereby, the operation of fractionating the culture medium and mixing the culture medium with the luminescent reagent is unnecessary, and therefore false-positive judgement due to contamination of microbes from the outside can be prevented. In addition, the culture medium and the luminescent reagent are separated, and the culture medium and the luminescent reagent are intermittently brought into contact with each other, so that ATP produced by the microbes is not always consumed by luminous reaction, and the ATP concentration in the culture medium increases in proportion to the microbial proliferation. Thus, the microbial proliferation can be detected with high sensitivity. Furthermore, since the microbial proliferation can be detected with high sensitivity, the luminescence can be measured in a shorter period than by the conventional turbidimetry and fluorimetry.

Example 2

Configuration Example of Cell Detector

Figure 4:
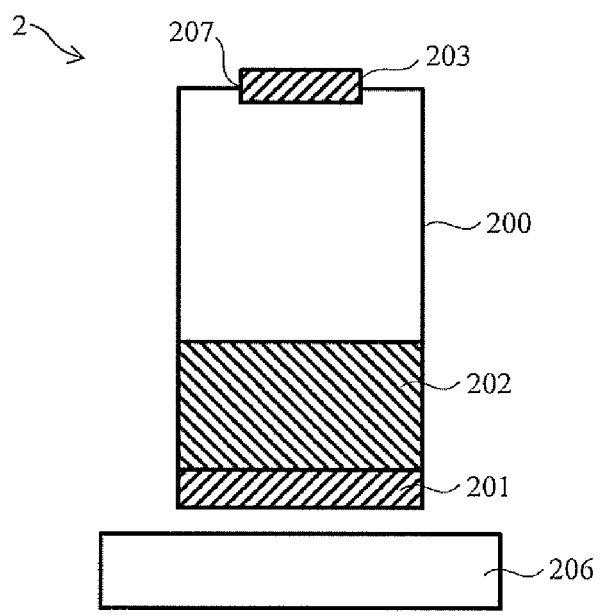
FIG. 4 is a configuration diagram illustrating a cell detector 2 according to Example 2.
Figure 5:
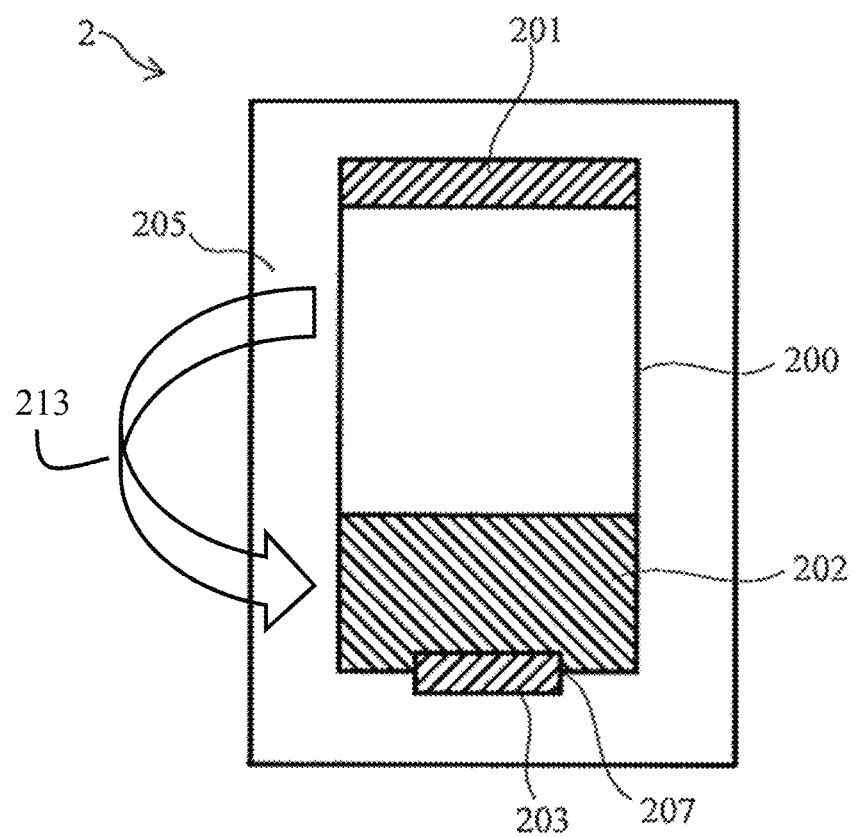
FIG. 5 is a configuration diagram illustrating the cell detector 2 according to Example 2.

A cell detector according to an embodiment of the present invention will be explained with reference to FIG. 4 and FIG. 5. FIG. 4 and FIG. 5 are configuration diagrams illustrating a cell detector 2 according to Example 2. FIG. 4 illustrates a state of the cell detector 2 during luminescence measurement, and FIG. 5 illustrates a state of the cell detector 2 during culture.

The cell detector 2 includes a sealing container 200 (culture portion and t mechanism) and a photodetector 206 as illustrated in FIG. 4. As a luminescent reagent 201, a luciferase is fixed to a bottom (luminescent reagent portion) of the sealing container 200. As a method of fixing the luciferase, a method in which a luciferase solution is gelated, a method in which the luciferase is fixed to an inner bottom face of the sealing container 200 through physical adsorption or covalent bond, a method in which the luciferase is introduced into the sealing container 200, on which a semi-permeable membrane that does not permeate the luciferase is placed, and the like can be used. A luciferin is either fixed together with the luciferase or added to a culture medium.

The sealing container 200 has an opening 207 at the top, and a septum 203 is fitted into the opening 207. A specimen that may contain microbes (cells) is sampled with a syringe, and a needle of the syringe can be stuck into the septum 203 to introduce the specimen into the sealing container 200.

At least a bottom of the sealing container 200 is made of a material through which a wavelength of light emitted by luminous reaction can transmit. For example, when the luminescent reagent is a substance that causes a reaction capable of emitting a visible light, the sealing container 200 can be made of a colorless and transparent plastic, glass, or the like.

The photodetector 206 is disposed at a position where light emitted from the luminescent reagent 201 can be detected. As illustrated in FIG. 4, the photodetector 206 is disposed under the bottom of the sealing container 200. Since the photodetector 206 can have the same configuration as of the photodetector 15 in Example 1, explanation of the photodetector 206 is omitted.

As illustrated in FIG. 5, it is preferable to use a shaking incubator 205 (temperature regulating means and stirring means) for culturing the microbes using the sealing container 200. The shaking incubator 205 refers to an incubator configured such that the sealing container 200 can be inserted into the shaking incubator 205, and intended to regulate a temperature of the sealing container 200 and stir the culture medium 202 by shaking the sealing container 200.

<Measurement Method>

Figure 6:
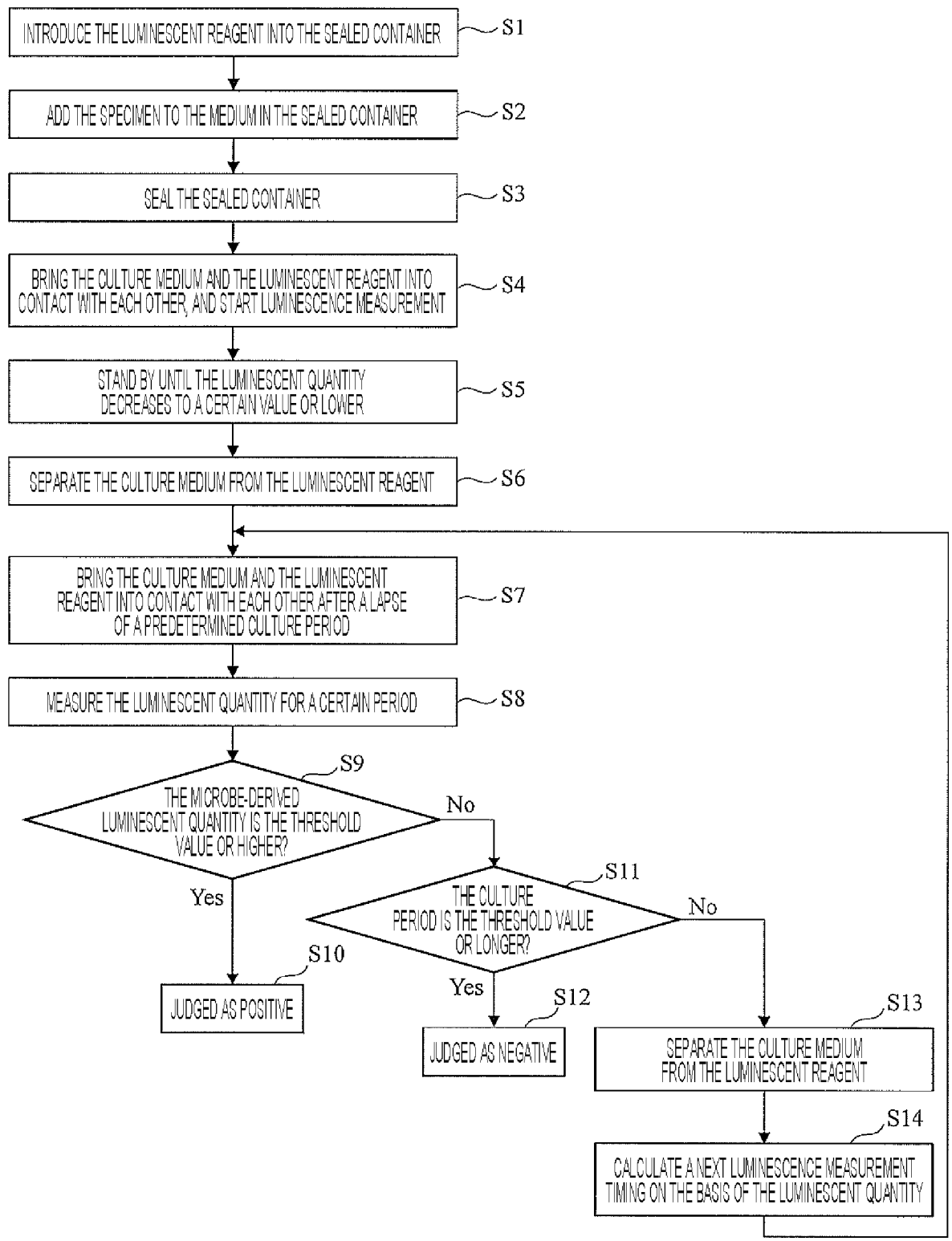
FIG. 6 is a flowchart illustrating an example of a measurement method using the cell detector 2 according to Example 2.

Next, an example of a measurement method using the cell detector 2 according to Example 2 will be explained with reference to FIG. 6. FIG. 6 is a flowchart presenting the measurement method according to Example 2. This measurement method refers to a measurement method for manually measuring luminescence using the cell detector 2.

In step S1, a user introduces the luminescent reagent 201 into the sealing container 200 and fixes the luminescent reagent 201 to the bottom of the sealing container 200. Subsequently, the user introduces a liquid medium containing the luciferin into the sealing container 200 to which the luminescent reagent 201 is fixed, and fits the septum 203 into the opening 207 and seals the opening. It is preferable to leave the liquid medium for several hours after the introduction of the liquid medium. Thereby, ATP originally contained in the liquid medium can be consumed by luminous reaction and luminescence derived from the liquid medium can be reduced.

At this time, a luminescent quantity is measured by the photodetector 206, and the user confirms that the luminescent quantity has been stabilized at a low value.

In step S2, the user samples a specimen using the syringe, sticks the needle of the syringe into the septum 203, and adds the specimen to the liquid medium to prepare a culture medium 202.

In step S3, the user pulls the syringe needle out of the septum. At this time, a hole formed by sticking the syringe needle is obstructed by an elastic force of the septum, so that the container is sealed.

In step S4, since the culture medium 202 and the luminescent reagent 201 are in contact with each other in the sealing container 200, the photodetector 206 begins to measure the luminescence as the measurement at hour 0.

In step S5, since luminous reaction is caused by free ATP in the culture medium 202, the user stands by until this luminescent quantity is stabilized at a low value. Thereby, the free ATP in the culture medium 202 can be reduced and backgrounds on the subsequent luminescence measurement can be reduced.

In step S6, the user inverts the sealing container 200 as illustrated in FIG. 5 to separate the luminescent reagent 201 and the culture medium 202. The user inserts the inverted sealing container 200 into the shaking incubator 205 and cultures the microbes for a certain period.

In step S7, after culture for the certain period, the user takes out the sealing container 200 from the shaking incubator 205 and erects the sealing container 200 upright as illustrated in FIG. 4, so that the culture medium 202 and the luminescent reagent 201 are brought into contact with each other.

In step S8, the photodetector 206 measures the luminescence for a prescribed period before and after the contact between the culture medium 202 and the luminescent reagent 201 (e.g. one minute before and after the contact). At this time, the luminous reaction occurs due to the free ATP increased in the culture medium 202 in association with microbial proliferation due to the culture, and therefore a luminescent quantity in proportion to the ATP concentration can be obtained. In addition, the photodetector 206 calculates a value obtained by subtracting a luminescent quantity immediately before the contact from a maximum value of a luminescent quantity after the contact between the culture medium 202 and the luminescent reagent 201, as a microbe-derived luminescent quantity.

In step S9, the calculation unit of the photodetector 206 determines whether the microbe-derived luminescent quantity is a certain threshold value or higher. When the microbe-derived luminescent quantity is the certain threshold value or higher, the calculation unit judges the specimen as positive in step S10, and concludes the luminescence measurement.

When the microbe-derived luminescent quantity is lower than the certain threshold value, the calculation unit determines whether the culture period is a certain period or longer in step S11. When the culture period is the certain period or longer, the photodetector 206 judges the specimen as negative in step S12, and concludes the luminescence measurement.

When the culture period is shorter than the certain period, the user inverts the sealing container 200 to separate the luminescent reagent 201 and the culture medium 202, inserts the inverted sealing container 200 into the shaking incubator 205, and cultures the microbes for a certain period, in step S13.

After step S13, the calculation unit calculates a timing for the next luminescence measurement on the basis of change in the luminescent quantity over time in step S14. At the next luminescence measurement timing, the process returns to step S7.

Incidentally, in step S14, the next luminescence measurement timing is not necessarily changed at every measurement, and for example, the timing may be set such that the measurement is conducted after one hour at every measurement. The next luminescence measurement timing may also be changed at every measurement e.g. such that the first luminescence measurement is conducted 1 hour after the start of the culture, the second luminescence measurement is conducted 2 hours after the first measurement, and the third luminescence measurement is conducted 3 hours after the second measurement.

<Technical Effect>

As described above, Example 2 adopts a configuration that the culture medium 202 is introduced into the sealing container 200 with the bottom to which the luminescent reagent 201 is fixed, and the contact and separation between the culture medium and the luminescent reagent are controlled by inverting the sealing container 200. Thereby, the same effect as in Example 1 can be exhibited.

Additionally, in Example 2, since only ATP released into the culture medium 202 in association with the microbial proliferation is measured, the microbes are not destroyed. Thus, the microbes can be taken out of the culture medium 202 after the luminescence measurement and used for identification of microbial species, isolation culture, drug sensitivity test, and the like.

Example 3

Configuration Example of Cell Detector

Figure 7:
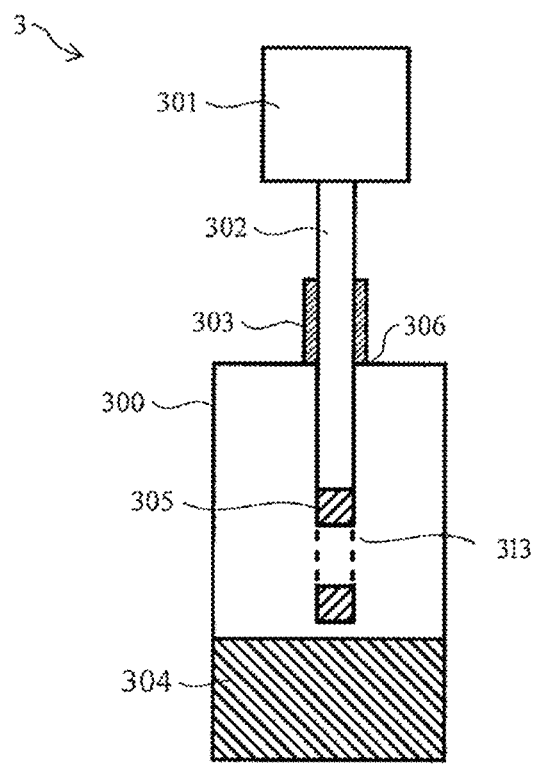
FIG. 7 is a configuration diagram illustrating a cell detector 3 according to Example 3.

A cell detector according to an embodiment of the present invention will be explained with reference to FIG. 7. FIG. 7 is a configuration diagram illustrating a cell detector 3 according to Example 3.

The cell detector 3 includes a sealing container 300 (culture portion), a photodetector 301, and an optical fiber 302 (luminescent reagent portion and contact mechanism) as illustrated in FIG. 7. The sealing container 300 contains a culture medium 304 including a specimen, a liquid medium, and a luciferin. The sealing container 300 has an opening 306 (specimen introducing portion) and is sealed by fitting a septum 303 into the opening 306.

The optical fiber 302 is put into the septum 303 so as to be inserted into the sealing container 300. A luminescent reagent 305 containing a luciferase is fixed to one end portion of the optical fiber 302, and the other end portion of the optical fiber 302 is connected to the photodetector 301. Light emitted at the one end portion of the optical fiber 302 where the luminescent reagent 305 is fixed is transmitted to the photodetector 301 by the optical fiber 302.

As the luminescent reagent 305, a chemiluminescent reagent capable of quantifying active oxygen produced by a reaction of a quinone and a quinone oxidoreductase can also be used. In this case, the chemiluminescent reagent is fixed to one end portion of the optical fiber 302, and the quinone is previously added to the culture medium 304.

Since the photodetector 301 can have the same configuration as of the photodetector 15 in Example 1, explanation of the photodetector 301 is omitted. The photodetector 301 detects light transmitted from the optical fiber 302.

<Measurement Method>

Next, a measurement method using the cell detector 3 according to Example 3 will be explained. This measurement method refers to a measurement method for manually measuring a luminescence using the cell detector 3.

First, the user introduces the culture medium 304 mixed with the specimen, the luciferin and a liquid medium into the sealing container 300 from an opening 306, fits the septum 303 into the opening 306 to seal the container, and cultures the specimen for a certain period. After fitting the septum into the opening 306, a needle of a syringe used for collecting the culture medium 304 is inserted into the septum, so that the culture medium 304 can also be introduced into the sealing container 300. The culture is preferably conducted in a shaking incubator (temperature regulating means and stirring means) that is not illustrated in the figure.

Next, the user introduces the optical fiber 302 with one end portion to which the luminescent reagent 305 is fixed into the sealing container 300 from the opening 306. After culture for the certain period, the user further inserts the optical fiber 302, and immerses the one end portion of the optical fiber 302 in the culture medium 304 to bring the luminescent reagent 305 and the culture medium 304 into contact with each other. The photodetector 301 measures the luminescence by detecting light transmitted from the optical fiber 302 for a prescribed period before and after the contact between the culture medium 304 and the luminescent reagent 305 (e.g. one minute before and after the contact). At this time, a luminous reaction is caused by free ATP increased in the culture medium 304 in association with the microbial proliferation due to culture, and therefore a luminescent quantity in proportion to the ATP concentration is obtained. In addition, a calculation unit of the photodetector 301 calculates a value obtained by subtracting a luminescent quantity immediately before the contact between the culture medium 304 and the luminescent reagent 305 from a maximum value of a luminescent quantity after the contact, as a microbe-derived luminescent quantity.

After the luminescence measurement, the user pulls the optical fiber 302 up from the culture medium 304 to separate the luminescent reagent 305 from the culture medium 304, and cultures the specimen for a certain period. As described above, change in an amount of free ATP in the culture medium 304 over time can be measured by repeating the culture and the luminescence measurement at a certain time interval. This time interval (culture period) may be constant or may be changed at an appropriate timing.

Also to the cell detector 3, the measurement method presented in FIG. 6 can be applied. In this case, in step S4, the user immerses one end portion of the optical fiber 302 in the culture medium 304 to start the luminescence measurement. In step S6, the user pulls the optical fiber 302 up to separate the luminescent reagent 305 from the culture medium 304.

<Technical Effect>

As described above, Example 3 adopts a configuration that the contact and separation between the culture medium 304 and the luminescent reagent 305 are controlled by immersing or pulling up the optical fiber 302 with the one end portion to which the luminescent reagent 305 is fixed, into or out of the culture medium 304. Thereby, the same effect as in Example 1 can be exhibited.

Additionally, in Example 3, since the local luminescence on one end portion of the optical fiber 302 efficiently reaches the photodetector 301, highly sensitive measurement is possible with a small amount of luminescent reagent 305.

Example 4

Configuration Example of Cell Detector

Figure 8:
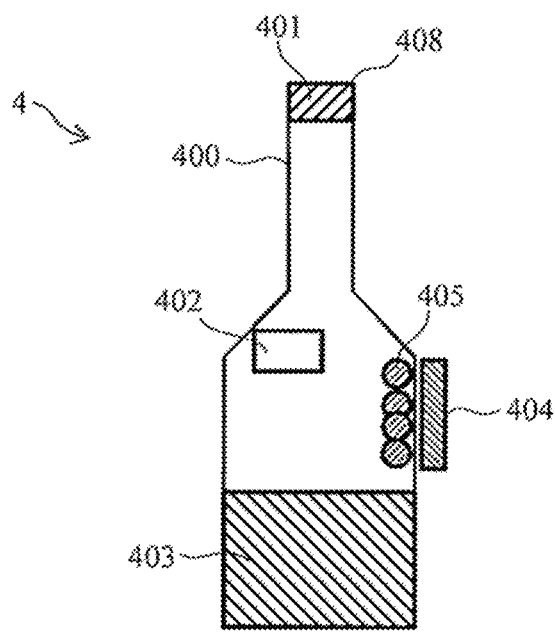
FIG. 8 is a configuration diagram illustrating a cell detector 4 according to Example 4.
Figure 9:
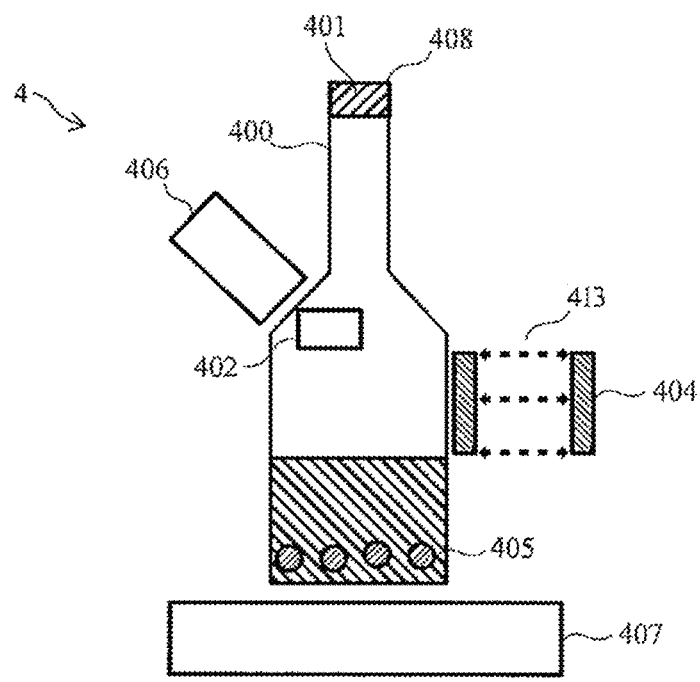
FIG. 9 is a configuration diagram illustrating the cell detector 4 according to Example 4.

A cell detector according to an embodiment of the present invention will be explained with reference to FIG. 8 and FIG. 9. FIG. 8 and FIG. 9 are configuration diagrams illustrating a cell detector 4 according to Example 4. FIG. 8 illustrates a state of the cell detector 4 during culture of microbes. FIG. 9 illustrates a state of the cell detector 4 during luminescence measurement.

As illustrated in FIG. 8 and FIG. 9, the cell detector 4 includes a culture bottle 400 (culture portion), a gas sensor 402, a magnet 404 (contact mechanism), magnetic beads 405 (luminescent reagent portion), a camera 406, and a photodetector 407. The culture bottle 400 is a container for containing a culture medium 403 including a specimen that may contain microbes (cells), and a liquid medium. The culture bottle 400 is sealed by fitting a septum 401 into an opening 408 (specimen introducing portion).

The culture bottle 400 at least around the culture medium is made of a material through which a wavelength of light emitted by luminous reaction transmits. For example, when a luminescent reagent is a substance that causes a reaction capable of emitting a visible light, the culture bottle 400 can be made of a colorless and transparent plastic, glass, or the like.

As a luminescent reagent, a luciferase is fixed to surfaces of the magnetic beads 405. The magnetic beads 405 are introduced into an inside of the culture bottle 400.

The magnet 404 is disposed on an outside of the culture bottle 400 and holds the magnetic beads 405 introduced into the inside of the culture bottle 400 through a wall face of the culture bottle 400. As illustrated in FIG. 8, the magnetic beads 405 are held by the magnet 404 at a position where the magnetic beads 405 do not come into contact with the culture medium 403 so that no luminous reaction occurs during introduction and culture of the culture medium 403. As illustrated in FIG. 9, the magnet 404 is separated from the culture bottle 400 during luminescence measurement, and thereby the magnetic beads 405 are dispersed into the culture medium 403.

Since the photodetector 407 can have the same configuration as of the photodetector 15 in Example 1, explanation of the photodetector 407 is omitted.

The gas sensor 402 is disposed at a position where the gas sensor 402 does not come into contact with the culture medium 403 in the culture bottle 400. The gas 402 includes a fluorescent dye that reacts with a volatile metabolite that is released from microbes in association with microbial proliferation and characteristic of the microbial species, and changes in a color tone. The gas sensor 402 makes it possible to identify the microbial species in the culture medium 403. After the microbial proliferation is judged as positive according to the luminescence measurement, the culture is continued as it is, so that the volatile metabolite is further accumulated in the culture bottle 400.

The camera 406 is disposed in the vicinity of the gas sensor 402 on the outside of the culture bottle 400 to observe the color tone of the gas sensor 402. The microbial species can be identified on the basis of the color tone of the gas sensor 402. The identification of the microbial species based on the color tone of the gas sensor 402 may be conducted by a user, or may be conducted by a processor connected to the camera 406.

<Measurement Method>

Next, an example of a measurement method using the cell detector 4 according to Example 4 will be explained. This measurement method refers to a measurement method for manually measuring a luminescence using the cell detector 4.

First, as illustrated in FIG. 8, the user introduces the magnetic beads 405 into the inside of the culture bottle 400 and collects the magnetic beads 405 on the inner wall face of the culture bottle 400 by the magnet 404. In addition, the user introduces a liquid medium and a luciferin into the culture bottle 400, and fits the septum 401 into the opening 408. The user samples a specimen using a syringe, sticks a needle of the syringe into the septum 401, and adds the specimen to the liquid medium to prepare the culture medium 403. After addition of the specimen, culture is conducted for a certain period. As illustrated in FIG. 8, during the culture, the position of the magnet 404 on the outside of the culture bottle 400 is manipulated to collect the magnetic beads 405 at a position away from the culture medium 403 so that a luminous reaction does not occur.

After culture for the certain period, the user separates the magnet 404 from the culture bottle 400 and disperses the magnetic beads 405 in the culture medium 403. The photodetector 407 measures the luminescence for a prescribed period before and after the contact between the culture medium 403 and the magnetic beads 405 (e.g. one minute before and after the contact).

After the luminescence measurement, the user collects the magnetic beads 405 again using the magnet 404 and separates the magnetic beads 405 from the culture medium 403. After the magnetic beads 405 are separated, the specimen is cultured again for a certain period.

As described above, change in an amount of free ATP in the culture medium 403 over time can be measured by repeating the contact between the culture medium 403 and the magnetic beads 405 and the luminescence measurement at a certain time interval. This time interval (culture period) may be constant or may be changed at an appropriate timing.

Also to the cell detector 4 in Example 4, the measurement method presented in FIG. 6 can be applied. In this case, in step S4, the user separates the magnet 404 from the culture bottle 400 and disperses the magnetic beads 405 in the culture medium 403 to start luminescence measurement. In step S6, the user brings the magnet 404 into contact with the culture bottle 400 to separate the magnetic beads 405 from the culture medium 403.

<Technical Effect>

As described above, Example 4 adopts a configuration that the contact and separation between the magnetic beads 405 to which the luminescent reagent is fixed and the culture medium 403 are controlled by the magnet 404. Thereby, in Example 4, the same effect as in Example 1 can be exhibited.

Furthermore, in Example 4, the contact and separation between the luminescent reagent and the culture medium 403 can be controlled only by changing the position of the magnet 404, and therefore the luminescence can be easily measured.

Example 5

Configuration Example of Cell Detector

Figure 10:
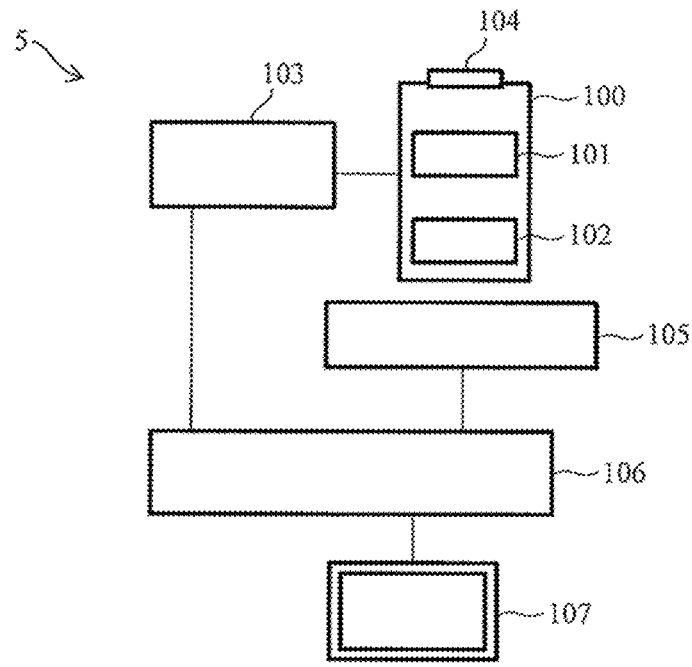
FIG. 10 is a configuration diagram illustrating a cell detector 5 according to Example 5.

A cell detector according to an embodiment of the present invention will be explained with reference to FIG. 10. FIG. 10 is a configuration diagram illustrating a cell detector 5 according to Example 5. The cell detector 5 is a device for automatically measuring a luminescence.

The cell detector 5 includes a sealing container 100, a contact mechanism 103, a photodetector 105, a processor 106, and a display unit 107, as illustrated in FIG. 10.

The sealing container 100 has a specimen introducing portion 104, a culture portion 101, and a luminescent reagent portion 102.

The culture portion 101 contains a culture medium including a specimen and a liquid medium. The luminescent reagent portion 102 contains a luminescent reagent. The luminescent reagent can be e.g. a luminescent reagent containing a luciferin, a luciferase and a surfactant, a chemiluminescent reagent that emits light by active oxygen, and the like. In the sealing container 100, the culture portion 101 and the luminescent reagent portion 102 are positioned away from each other, so that the culture medium and the luminescent reagent are separated.

The inside of the sealing container 100 is preferably sterilized, and the specimen or the culture medium is preferably aseptically introduced into the culture portion 101.

The specimen introducing portion 104 has a structure that, after the culture medium is introduced into the culture portion 101, the sealing container 100 can be sealed to prevent microbial invasion (contamination) from the outside. The sealing container 100 can be sealed by fitting e.g. a septum into the specimen introducing portion 104.

The cell detector 5 may include a syringe (not shown) for introducing the culture medium or the specimen from the specimen introducing portion 104, and a syringe driving unit (not shown) for controlling the drive of the syringe. In this case, the culture medium or the specimen is sampled by the syringe, and a needle of the syringe is penetrated through the septum, so that the culture medium or the specimen can be added into the sealing container 100. Alternatively, the specimen introducing portion 104 may have a structure that the sealing container 100 can be sealed by an openable/closable cap such as a screw cap.

A liquid medium containing a component for enhancing the microbial growth or a component for capturing a substance that inhibits the microbial growth may be previously put into the culture portion 101, to which the specimen may be added to prepare a culture medium.

The sealing container 100 at least around the luminescent reagent portion 102 is made of a material through which a wavelength of light emitted by luminous reaction transmits. For example, when the luminescent reagent is a substance that causes a reaction capable of emitting a visible light, the sealing container 100 can be made of a colorless and transparent plastic, glass, or the like.

The contact mechanism 103 controls the contact between the culture medium in the culture portion 101 and the luminescent reagent in the luminescent reagent portion 102. The contact mechanism 103 is preferably disposed outside the sealing container 100 to prevent contamination of the culture medium.

An example of the contact mechanism 103 will be explained. A device in which the cell detector 1 in Example 1 is automated is assumed. In this case, the cell detector 1 further includes a plunger controller that drives the plunger 13. When the plunger controller drives the plunger 13, the culture medium is dripped into the luminescent reagent. Thus, the plunger 13 and the plunger controller correspond to the contact mechanism 103.

In addition, assuming a device in which the cell detector 2 in Example 2 is automated, the cell detector 2 further includes a sealing container driving unit for inverting the sealing container 200. In the cell detector 2, the luminescent reagent is fixed to the bottom of the sealing container 200, and when the sealing container driving unit inverts the sealing container 200, the culture medium and the luminescent reagent can be brought into contact with each other. Thus, the sealing container 200 and the sealing container driving unit correspond to the contact mechanism 103.

Furthermore, assuming a device in which the cell detector 3 in Example 3 is automated, the cell detector 3 further includes an optical fiber driving unit for moving the optical fiber 302 up and down. The luminescent reagent is fixed to the tip of the optical fiber 302, and when the optical fiber driving unit moves the optical fiber 302 up and down, the luminescent reagent can be brought into contact with the culture medium. Thus, the optical fiber 302 and the optical fiber driving unit correspond to the contact mechanism 103.

Furthermore, assuming a case that the cell detector 4 in Example 4 is automated, the cell detector 4 further includes a magnet driving unit for driving the magnet 404. In the cell detector 4, the luminescent reagent is fixed to the magnetic beads 405, and the magnetic beads 405 can be dispersed in the culture medium 403 or separated from the culture medium 403 by the magnet 404. Thus, the magnet 404 and the magnet driving unit correspond to the contact mechanism 103.

Although not illustrated in the figure, the processor 106 includes a control unit that controls the contact mechanism 103 and the photodetector 105, a calculation unit that receives detection signals from the photodetector 105 and conducts calculation of a luminescent quantity, judgement of the specimen as positive or negative, and the like, and a storage unit that stores data such as a certain threshold value for judging the specimen as positive or negative from the microbe-derived luminescent quantity. A user can previously set a time interval for measuring the luminescence such that the luminescence measurement is started from the start of the culture and the luminescence is measured e.g. every hour. The processor 106 can also store the time interval in the storage unit. The processor 106 may be configured to calculate the time interval for the luminescence measurement on the basis of the past data and the like.

The cell detector 5 may include a gas feeding means for feeding a gas with an adjusted composition to the outside of the sealing container 100. In this case, it is preferable that a part of the wall of the sealing container 100 or the specimen introducing portion 104 be made of a material through which cells do not pass and a gas can pass. Examples of the material through which a gas can pass includes a membrane filter having a pore diameter of about 0.1 μm. In this way, the gas composition in the sealing container 100 is controlled from the outside of the sealing container 100, thereby the gas composition can be adapted to the microbial proliferation, and therefore the microbial proliferation can be accelerated. For example, when detecting aerobic microbes, a proliferation rate of the microbes can be improved by feeding an aerobic gas containing oxygen to the outside of the sealing container 100. When detecting microbes that cannot grow in the presence of oxygen like obligate anaerobes, proliferation of the anaerobes is enabled by feeding an anaerobic gas from which oxygen is removed, such as nitrogen and argon, to the outside of the sealing container 100. Also, it is possible to take a configuration that an anaerobic gas is introduced into the culture portion 101 and an oxygen-containing gas is fed to the luminescent reagent portion 102.

During the culture, the inside of the sealing container 100 may be kept at a constant temperature, and, for that, the cell detector 5 may include a temperature regulator (not shown). Since an optimum proliferation temperature varies depending on the microbial species, proliferation can be accelerated by culture at a temperature suitable for each microbe.

The display unit 107 receives and displays the calculated luminescent quantity, the positive or negative judgement result, and the like from the processor 106. The judgement result may be displayed e.g. as an alarm or the like, on the display unit 107.

The cell detector 5 may include a speaker not illustrated in the figure. The speaker can emit a positive judgement result as an alarm sound.

The cell detector 5 can be used e.g. for determining the presence or absence of fungi or bacteria in a specimen, monitoring proliferation of cultured cells, and the like.

<Measurement Method>

Next, an example of a measurement method using the cell detector 5 according to Example 5 will be explained. As the measurement method in Example 5, for example, the measurement method presented in FIG. 6 can be adopted, and therefore FIG. 6 is referred to.

In step S1, the user introduces the luminescence reagent into the luminescent reagent portion 102, previously introduces the liquid medium into the culture portion 101, and fits the septum into the specimen introducing portion 104 to seal the sealing container 100.

In step S2, the user samples a specimen using the syringe. The user sticks the syringe needle into the septum to insert the needle into the container. The user adds the specimen to the liquid medium in the culture portion 101 from the syringe to prepare a culture medium.

In step S3, the user pulls the syringe needle out of the septum. At this time, a hole formed by the syringe needle is obstructed by an elastic force of the septum, so that the sealing container 100 is sealed.

In step S4, the processor 106 transmits signals for driving the contact mechanism 103 to the contact mechanism 103, and the contact mechanism 103 brings the culture medium and the luminescent reagent into contact with each other. As measurement at hour 0, the photodetector 105 starts the luminescence measurement such that the measurement can be conducted for a prescribed period before and after the contact (e.g. for 1 minute before and after the contact). At this time, the processor 106 receives the detection signals from the photodetector 105 to calculate the luminescent quantity derived from the culture medium.

In step S5, first, the processor 106 does not drive the contact mechanism 103 until the luminescent quantity decreases to a certain value or lower, and keeps the contact between the culture medium and the luminescent reagent. Thereby, free ATP in the culture medium can be reduced, and backgrounds in the subsequent luminescence measurement can be reduced.

In step S6, the processor 106 drives the contact mechanism 103 when the luminescent quantity decreases to a certain value or lower. The contact mechanism 103 separates the culture medium from the luminescent reagent, and the cells in the culture medium are cultured for a certain period, e.g. 1 hour.

In step S7, when the certain period has elapsed, the processor 106 transmits signals for the luminescence measurement to the photodetector 105 to start the luminescence measurement. In addition, the processor 106 transmits signals for driving the contact mechanism 103 to the contact mechanism 103, and the contact mechanism 103 brings the culture medium and the luminescent reagent into contact with each other.

In step S8, the photodetector 105 detects the luminescence for a prescribed period before and after the contact (e.g. one minute before and after the contact). At this time, the processor 106 receives the detection signals from the photodetector 105 and calculates the luminescent quantity to calculate a value obtained by subtracting the luminescent quantity immediately before the contact from a maximum value of the luminescent quantity after the contact, as a microbe-derived luminescent quantity.

In step S9, the processor 106 determines whether the microbe-derived luminescent quantity is a certain threshold value or higher. In step S10, when the microbe-derived luminescent quantity is the certain threshold value or higher, the processor 106 judges the specimen as positive, allows the display unit 107 to display the judgement results, and concludes the luminescence measurement.

In step S11, when the microbe-derived luminescent quantity is lower than the certain threshold value, the processor 106 determines whether the culture period is a certain period or longer. When the culture period is the certain period or longer, the processor 106 judges the specimen as negative in step S12, and allows the display unit 107 to display the judgement result to conclude the luminescence measurement.

When the culture period is shorter than the certain period, the processor 106 transmits signals for driving the contact mechanism 103 to the contact mechanism 103, and the contact mechanism 103 separates the culture medium from the luminescent reagent in step S13. After step S13, the processor 106 calculates a timing for the next luminescence measurement from changes in the luminescent quantity over time in step S14. At the next luminescence measurement timing, the process returns to step S7.

In step S14, the next luminescence measurement timing may not be changed at every measurement, and for example, the timing may be set such that the measurement is conducted after one hour at every measurement. Alternatively, in step S14, the next luminescence measurement timing may be changed at every measurement e.g. such that the first luminescence measurement is conducted 1 hour after the start of the culture, the second luminescence measurement is conducted 2 hours after the first measurement, and the third luminescence measurement is conducted 3 hours after the second measurement.

<Technical Effect>

As described above, Example 5 adopts a configuration that the culture portion 101 and the luminescent reagent portion 102 are positioned away from each other, and the contact mechanism automatically controls the contact and the separation between the culture medium and the luminescent reagent. Thereby, in Example 5, the same effect as in Example 1 can be exhibited.

In the conventional automated cell detector, a mechanism for performing complicated fractionation operations such as suction and discharge of a culture medium and disposable pipette tips is required, and there has been a problem of complicated devices. On the other hand, in Example 5, the mechanism for performing the fractionation operations is unnecessary, and the device can be simply configured, as the above configuration. In addition, since the operation of fractionating the culture medium is unnecessary, false-positive judgement due to microbial invasion from the outside can be prevented.

Example 6

Configuration Example of Cell Detector

Figure 11:
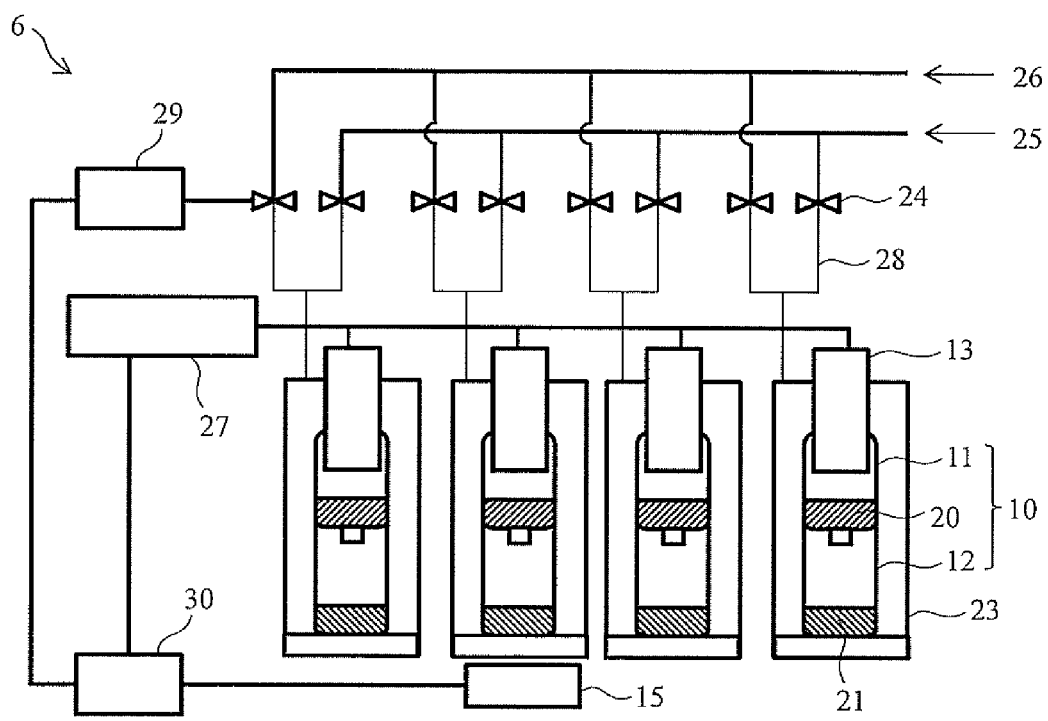
FIG. 11 is a configuration diagram illustrating a cell detector 6 according to Example 6.

A cell detector according to an embodiment of the present invention will be explained with reference to FIG. 11. FIG. 11 is a configuration diagram illustrating a cell detector 6 according to Example 6.

The cell detector 6 is a device that includes a plurality of sealing containers 10 and can simultaneously measure a plurality of specimens. In the example illustrated in FIG. 11, four sealing containers 10 are disposed. In Example 6, since the same sealing container as the sealing container 10 according to Example 1 illustrated in FIG. 1 is used, explanation of each component of the sealing container is omitted. As the sealing container, the sealing containers illustrated in FIG. 4, FIG. 5 and FIG. 7 to FIG. 9 can also be adopted.

An identification number such as a bar code is attached to each of the sealing containers 10, and each sealing container 10 is set to be subjected to the luminescence measurement at the same or different time intervals. The changes in the luminescent quantity of the plurality of sealing containers 10 over time can be acquired in parallel.

As illustrated in FIG. 11, the cell detector 6 includes the sealing container 10 as well as a plurality of plungers 13 fitted into each sealing container 10 and a plunger controller 27 (contact mechanism), a chamber 23 (temperature regulating means) for covering each sealing container 10, a gas feeding pipe 28 (gas feeding means), a valve 24 and a valve controller 29 (gas feeding means), and a processor 30.

The chamber 23 regulates a temperature of each sealing container 10. Since each sealing container 10 includes the chamber 23, the microbes can be cultured at a temperature suitable for each specimen, and can proliferate under an optimum condition.

The plunger controller 27 controls movement of each plunger 13. For each sealing container 10, the plunger controller 27 pushes the plunger 13 to a certain extent at every certain time interval to drip the culture medium 20.

The gas feeding pipe 28 is intended to introduce a gas 25 or a gas 26 into each chamber 23. The gas 25 is e.g. an oxygen-containing gas. The gas 26 is e.g. an oxygen-free gas. By opening and closing the valve 24, passage/non-passage of the gas 25 or 26 to the gas feeding pipe 28 is switched. The valve controller 29 controls opening/closing of each valve 24. Although not illustrated in the figure, the valve controller 29 is connected to each valve 24.

By controlling the introduction of the gas 25 and the gas 26 into the chamber 23 by the valve 24, the gas concentration of each chamber 23 can be managed. A part of the upper container 11 can be made of a material through which microbes cannot pass and the gas can permeate (e.g. a membrane filter). Thereby, an anaerobe or an aerobe can be cultured in each sealing container 10, and both the anaerobe and the aerobe can be simultaneously detected.

The processor 30 controls the photodetector 15, the plunger controller 27, and the valve controller 29. Although not illustrated in the figure, the processor 30 includes a calculation unit that receives detection signals from the photodetector 15 and conducts calculation of the luminescent quantity, judgement of the specimen as positive or negative, and the like, and a storage unit that stores data such as a certain threshold value for judging the specimen as positive or negative from the microbe-derived luminescent quantity.

A plurality of photodetectors 15 may be prepared and disposed on each sealing container 10. Thereby, a conveyer for moving the sealing container 10 or the photodetector 15 is unnecessary, and the cell detector 6 can be downsized. Alternatively, as illustrated in FIG. 11, the number of the photodetectors 15 may be one. A plurality of photodetectors 15 need not be disposed by conveying the sealing container 10 to the photodetector 15 or by moving the photodetector 15 to the sealing container 10, and the cost can be reduced.

As described above, in Example 6, the plunger controller 27 pushes the plunger 13 to drip the culture medium 20. However, instead of the plunger 13, the gas feeding pipe 28 may be connected to the upper container 11 to feed the gas 25 or 26 to the upper container 11, so that the culture medium 20 can be dripped by a pressure of the gas 25 or 26. In this case, the valve controller 29 controls the opening/closing of the valve 24 at a certain time interval for each sealing container 10. In addition, it is preferable that the gas feeding pipe 28 connected to the upper container 11 include a filter for preventing contamination, and the gas 25 or 26 be fed to the upper container 11 through the filter.

<Measurement Method>

Next, an example of a measurement method using the cell detector 6 according to Example 6 will be explained.

First, for each sealing container 10, a user introduces the luminescent reagent 21 into the lower container 12, fits the upper container 11 into the lower container 12, and introduces the culture medium 20 into the upper container 11, then fits the plunger 13 into the upper container 11, and seals the sealing container 10. The user sets each sealed sealing container 10 in the chambers 23.

Next, the processor 30 transmits signals to the plunger controller 27 to allow the plunger controller 27 to drive the plunger 13, so that the culture medium 20 is dripped and mixed with the luminescent reagent 21. At this time, the processor 30 allows the photodetector 15 to start to detect the luminescence in order to measure the luminescent quantity at hour 0 (initial microbe concentration). After measuring the luminescent quantity at hour 0, the processor 30 stands by for a certain period and then culture is conducted. The processor 30 calculates a value obtained by subtracting a luminescent quantity immediately before dripping of the culture medium 20 from a maximum value of a luminescent quantity after dripping of the culture medium 20 (increment in the luminescent quantity), as the microbe-derived luminescent quantity.

After the certain period has elapsed, e.g. one hour later, the processor 30 transmits signals to the plunger controller 27, and the plunger controller 27 drives the plunger 13 again to a certain extent, and the culture medium 20 in the same amount as at hour 0 is dripped into the luminescent reagent 21. In addition, at this time, the processor 30 allows the photodetector 15 to start to measure the luminescence, and the photodetector 15 measures the luminescent quantity at hour 0 to calculate the microbe-derived luminescent quantity. Then the culture is conducted again for a certain period.

As described above, dripping of the culture medium and measurement of the luminescent quantity are repeated at a certain time interval to determine the microbial proliferation from changes in the luminescent quantity over time. This time interval (culture period) may be constant or may be changed at an appropriate timing.

When the increment in the luminescent quantity of the entire culture medium or the luminescent quantity derived from the microbes reaches a certain threshold value or higher, the processor 30 deems the microbes to have proliferated and judges the specimen as positive, and the luminescence measurement is completed.

The period required for the positive judgement varies depending on differences in the initial concentration and the microbial species. As described above, in order to prevent microbial contamination from the outside, it is necessary to keep the specimen from being put in and out of the outside after sealing of the sealing container 10. Therefore, the number of the luminescence measurements is limited by an amount of the culture medium at the initial stage of measurement. Thus, when measuring the luminescent quantity at a certain time interval, the processor 30 can be programmed such that the time interval of the luminescence measurement is automatically widened when the change in the luminescent quantity from the previous measurement is small and the proliferation is determined as being slow. Thereby, a long-term change over time according to a slowly-proliferating microbe can be measured.

Also to the cell detector 6 in Example 6, the measurement method presented in FIG. 6 can be applied. In this case, in step S4, the plunger controller 27 drives the plunger 13 to a certain extent to drip the culture medium 20, to start the luminescence measurement. Step S6 is not performed because the culture medium 20 dripped into the lower container 12 cannot be separated.

<Technical Effect>

As described above, Example 6 adopts a configuration that the culture medium and the luminescent reagent are contained in the sealing container so as to be positioned away from each other, and the culture medium is dripped into the luminescent reagent, as in Example 1. Thereby, in Example 6, the same effect as in Example 1 can be exhibited.

In addition, since Example 6 adopts a configuration including a plurality of sealing containers, luminescences of a plurality of specimens can be simultaneously measured, and a measurement period can be shortened. Furthermore, since Example 6 adopts a configuration that gases having different compositions can be fed to each of a plurality of sealing containers, luminescences of different microbial species such as anaerobes and aerobes can be simultaneously measured.

REFERENCE SIGNS LIST 10, 100, 200 sealing container
11 upper container
12 lower container
13 plunger
14 flow passage
15, 105, 206, 301, 407 photodetector
16 stirring bar
17, 18, 207, 306, 408 opening
20, 202, 304, 403 culture medium
21, 201, 305 luminescent reagent
23 chamber
24 valve
25 oxygen-containing gas
26 oxygen-free gas
27 plunger controller
28 gas feeding pipe
29 valve controller
30, 106 processor
101 culture portion
102 luminescent reagent portion
103 mechanism for bringing the culture portion and the luminescent reagent into contact with each other
104 specimen introducing portion
107 display unit
203, 303, 401 septum
205 shaking incubator
213 sealing container driving unit
302 optical fiber
313 optical fiber driving unit
400 culture bottle
402 gas sensor
404 magnet
413 magnet driving unit
405 magnetic beads
406 camera

The invention claimed is:

1. A cell detector for detecting cells in a specimen, the cell detector comprising:
a sealing container that is configured to receive the specimen, wherein the sealing container includes:
a culture medium that is configured to be moveable within the sealing container between a first position and a second position within the sealing container,
a sealable specimen introducing portion, wherein the specimen is introduced to the culture medium via the sealable specimen introducing portion, and
a luminescent reagent that contains a luciferase,
a photodetector that detects a luminescence generated when the luciferase catalyzes a reaction between adenosine triphosphate (ATP) derived from the cells of the specimen and luciferin;
one or more controllers;
a contact mechanism for intermittently controlling a contact between the culture medium and the luminescent reagent; and
a processor that is communicatively coupled to the photodetector, the contact mechanism, and the one or more controllers, wherein the processor and the one or more controllers are collectively configured to:
control the contact mechanism to control contact between the culture medium and the luminescent reagent through a cycle after the specimen is received into the sealing container, wherein during the cycle, the contact mechanism intermittently moves the culture medium or the luminescent reagent from the first position where a portion of the culture medium does not contact the luminescent reagent to the second position where the portion contacts the luminescent reagent,
receive signals from the photodetector,
calculate a luminescent quantity based on the signals received from the photodetector,
repeat the cycle at least two times, and
determine cell proliferation based on changes in the calculated luminescent quantity during the cycles.

2. The cell detector according to claim 1, wherein the processor and the one or more controllers are further collectively configured to:
calculate a determination result based on the cell proliferation, and
display the determination result.

3. The cell detector according to claim 1, wherein the processor and the one or more controllers are further collectively configured to:
adjust composition of a gas outside of the sealing container, wherein the sealing container is configured to seal the cells but to be permeable by the gas.

4. The cell detector according to claim 1, wherein the processor and the one or more controllers are further collectively configured to:
regulate a temperature of the sealing container.

5. The cell detector according to claim 1, further comprising:
a gas sensor in the sealing container, wherein
the gas sensor includes a fluorescent dye that emits fluorescence having a different color tone depending on a volatile metabolite produced by microbes in the specimen and the gas sensor is configured to identify a microbial species according to the color tone.

6. The cell detector according to claim 1, wherein the cycle moves the culture medium from the first position to the second position and back to the first position after a predetermined period of time has elapsed.

7. The cell detector according to claim 1, wherein the sealing container is further configured to receive the luciferin.

8. The cell detector according to claim 1, wherein the luciferin is included in the luminescent reagent.

9. The cell detector according to claim 1, wherein the contact mechanism includes a plunger and a plunger controller.

10. The cell detector according to claim 1, wherein the contact mechanism includes a sealing container driving unit.

11. The cell detector according to claim 1, wherein the contact mechanism includes an optical fiber and an optical fiber driving unit.

12. The cell detector according to claim 1, wherein the contact mechanism includes a magnet and a magnet driving unit.

13. The cell detector according to claim 1, wherein during the cycle, the contact mechanism further moves the culture medium back to the first position from the second position.

14. The cell detector according to claim 12, wherein
the luminescent reagent is fixed to a surface of magnetic beads that are controlled by the magnetic drive unit.

15. The cell detector according to claim 11, wherein
the luminescent reagent is fixed to one end of the optical fiber, and the optical fiber is configured such that the other end is connected to the photodetector, the one end is inserted from the sealable specimen introducing portion into the sealing container, and the one end can be put in and out of the culture medium.

\* \* \* \* \*